No. 714,093. Patented Nov. 18, 1902.
J. W. BLACKLEDGE.
DYNAMO ELECTRIC MACHINE OR MOTOR.
(Application filed Feb. 1, 1902.)
(No Model.) 2 Sheets—Sheet 1.

WITNESSES: INVENTOR.
F. W. Woerner. John W. Blackledge
F. E. Bryant. BY V. H. Lockwood
ATTORNEY.

No. 714,093. Patented Nov. 18, 1902.
J. W. BLACKLEDGE.
DYNAMO ELECTRIC MACHINE OR MOTOR.
(Application filed Feb. 1, 1902.)
(No Model.) 2 Sheets—Sheet 2.
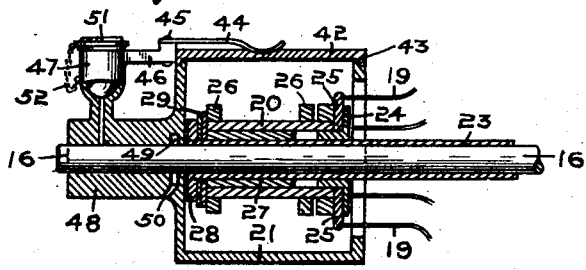
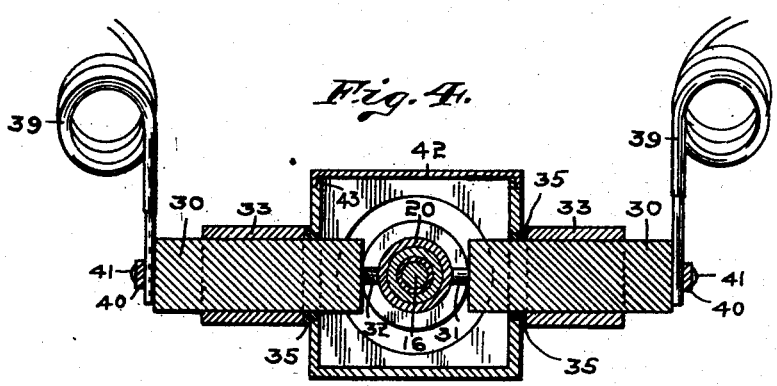
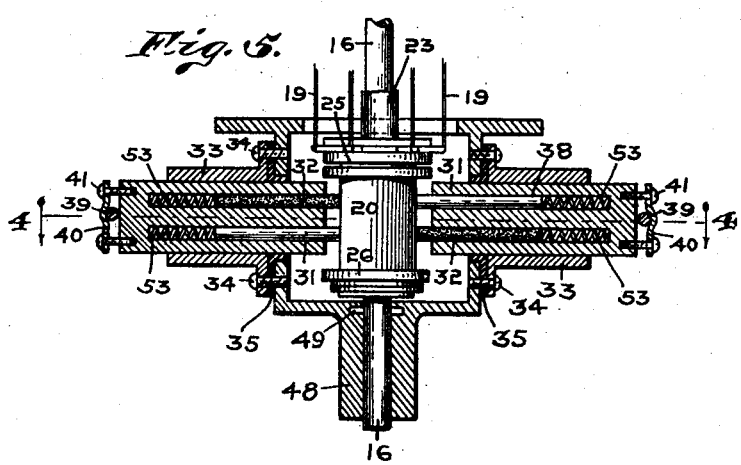
WITNESSES: F. W. Warner. F. E. Bryant.
INVENTOR. John W. Blackledge
BY V. H. Lockwood.
ATTORNEY.

UNITED STATES PATENT OFFICE.

JOHN W. BLACKLEDGE, OF CHICAGO, ILLINOIS.

DYNAMO-ELECTRIC MACHINE OR MOTOR.

SPECIFICATION forming part of Letters Patent No. 714,093, dated November 18, 1902.

Application filed February 1, 1902. Serial No. 92,155. (No model.)

*To all whom it may concern:*

Be it known that I, JOHN W. BLACKLEDGE, of Chicago, county of Cook, and State of Illinois, have invented a certain new and useful Dynamo-Electric Machine or Motor; and I do hereby declare that the following is a full, clear, and exact description thereof, reference being had to the accompanying drawings, in which like numerals refer to like parts.
The object of this invention is to improve the construction of dynamos and motors, especially the commutator end thereof, to render it more useful in automobiles and any other place where it is subjected to jarring or shaking.

The invention herein is an improvement on the electrical apparatus shown and described in the United States Letters Patent granted to John E. Everett, December 10, 1901, No. 688,401.

The nature of the invention will be understood from the accompanying drawings and the following description and claims.

Figure 1:
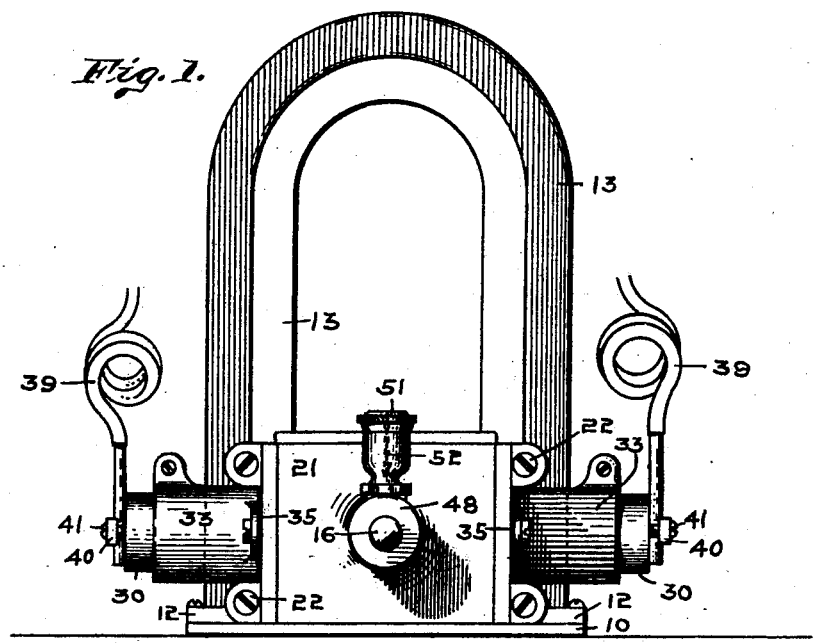
Figure 2:
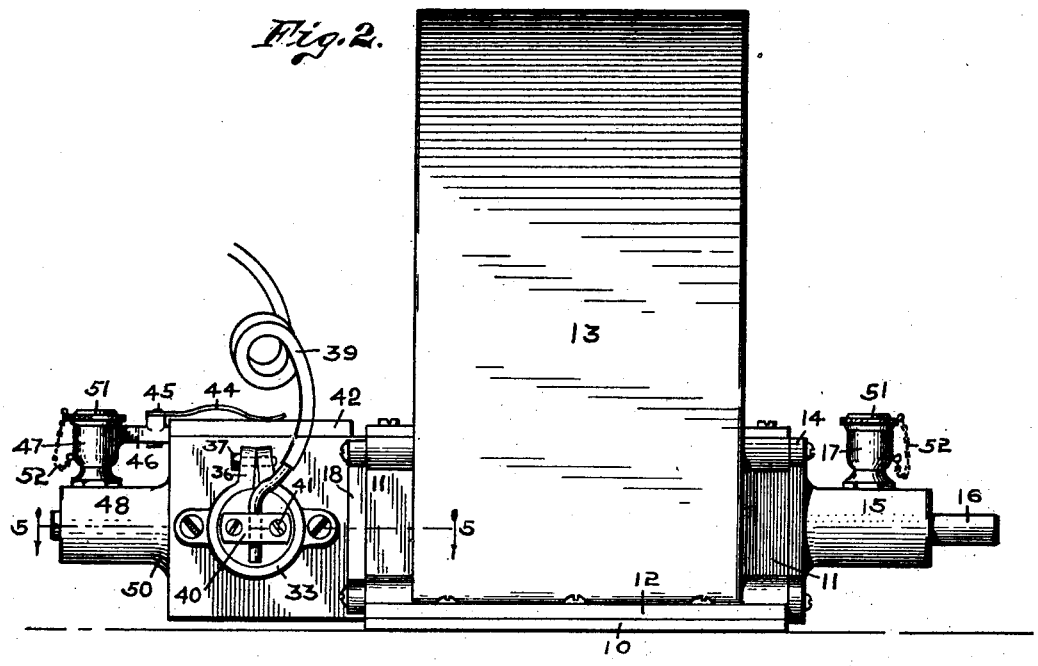

In the drawings, Figure 1 is an elevation of the commutator end of the apparatus. Fig. 2 is a side elevation of the apparatus. Fig. 3 is a central vertical longitudinal section of the commutator end of the apparatus. Fig. 4 is a vertical cross-section on the line 4 4 of Fig. 5. Fig. 5 is a central horizontal section of a portion on the line 5 5 of Fig. 2, the commutator being in plan and parts broken away.

In detail, 10 is a base-plate which carries the pole-pieces 11, having the flanges 12, on which the magnet 13 is secured. The end plate 14 is secured to the pole-pieces at one end and has integral a horizontally-extending bearing 15 for the shaft 16 and also an oil-cup 17. At the other end of the pole-pieces a plate 18 is secured, and the shaft 16 extends also through it. The armature (not here shown) is on the shaft 16 within the pole-pieces and between the end plates 14 and
18. The wires 19 extend from the armature and are connected with the commutator 20. This part of the foregoing mechanism is not new, so far as this invention is concerned.

A rectangular box 21 is secured by the screws 22 to the commutator end of the pole-pieces and has integral with it the bearing 22. The shaft 16 extends through said box 21 and bearing 22, and the commutator 20 is mounted on the shaft 16 within the box 21. A sleeve 23 is mounted on the shaft 16. A collar 24, made of rubber or other insulating material, is secured to said sleeve and on the commutator side thereof is cut out to form an annular recess about its central opening adapted to receive the end of the commutator. A number of contact-pieces 25 are secured in said collar and extend radially through its rim and are substantially equidistant from each other. The conducting-wires 19 are secured to the outer ends of these contact-pieces. Said contact-pieces are arranged in the same vertical plane which intersects the axis of the shaft 16 at a right angle.

The commutator consists of a number of bars separated by suitable insulating material and held together by the rings 26. There is an inner lining of insulating material 27. The commutator is slipped over the sleeve 23 and forced against said contact-pieces 25 by the nut 28, that screws on the threaded end of the sleeve 23 and bears against the washers 29, lying between the nut and the commutator. The particular construction of commutator just described is the same as that shown in the Everett patent above mentioned.

The box 21 has a hole on each side opposite the commutator, through which the brush-holders 30 extend that carry the brushes 31 and 32. Said brush-holders are held by the clamping-sleeve 33, that at its inner end is secured to the box by the screws 34, there being insulation 35 between the box and the sleeve. The hole in the side of the box is of larger diameter than the brush-holder, and the brush-holders are insulated from the box. The sleeve 33 is split on its upper side for about half of its length at its outer end and has integral with it on each side of the split upwardly-extending ears 36, that are drawn together by the screw 37. With this arrangement the screw 37 can draw the outer end of the sleeve so as to bind and hold the brush-holder, and yet there is a tension acting on the screw which holds it in place and prevents it from coming out by reason of the jarring, such as a device of the kind would receive in an automobile.

The brush-holders are made of solid cylindrical bars provided with two longitudinallyextending holes 38, that do not extend entirely through the brush-holder. A spiral spring 53 is placed in each of these holes and the brush afterward inserted, so that the spring will tend to force the brush against the commutator and cause positive contact at all times, even after wear. The brushes are charged by the wires 39, that are clamped against the ends of the brush-holders by the clamping-bars 40, held by a plurality of screws 41. This means for securing the wire to the brush-holder is to prevent the loosening of it when subjected to great jarring, such as a device would receive in an automobile.
This result is accomplished by the spring tension of such clamping means.

It is desirable that the box 21 be opened at the upper end to render the commutator accessible and to enable it to be readily seen.
Therefore a lid 42 is provided that has a downwardly-extending flange that fits snugly about the upwardly-extending flange 43 on the box, that has a shoulder or ledge surrounding it. This renders the box practically water and dust tight. The lid is held in place by the spring 44, that is pivoted by the rivet 45 to the bar 46, that extends from the oil-cup 47 to the box 21. This rivet cannot escape on account of jarring of the device, and the spring can be turned laterally away from the lid of the box without difficulty. The free end of the spring is turned downward somewhat to fit in a recess in the top of the lid. This effects a secure closure for the device when subjected to great jarring, and the spring cannot escape from its place in such a device when used in an automobile.

To prevent the oil from the oil-cup 47 entering the box 21, a groove 49 is made in the bearing 48 circumferentially, and near the box 21 it has an outlet through the hole 50 in the under side of the bearing. To prevent the escape of the lid 51 of the oil-cups when the device is used in an automobile or any other place where it is subjected to jarring, a chain 52 connects said lid with the oil-cup.

The chief improvement in this invention consists in making the brushes 31 of copper or other metal and the brushes 32 of carbon or some material containing a lubricant of some sort. There are here shown two pairs of brushes, the brushes of each pair being on opposite sides of the commutator. One of these brushes is made of copper or like material and the other of carbon or some material containing a lubricant. These two brushes travel in the same path on the commutator, and therefore the brush containing the lubricant lubricates the commutator along the path of the metal brush and greatly reduces the wear of the commutator and brush. The brush containing the lubricant is made preferably of a material that renders the brush an electrical conductor. Where two pairs of brushes are used, as herein shown, the diagonally-opposite ones are made of the same materials. Another advantage of having double brushes on each side is that if any one brush should fail to operate properly there would always be at least one brush on each side directly in contact with the commutator.

What is claimed to be the invention and to be secured by Letters Patent is—

1. In an apparatus of the class described, a commutator, a brush-holder mounted on each side of the commutator, each brush-holder having in it a pair of holes in the same horizontal plane and extending at a right angle to the commutator and directly opposite the holes in the other brush-holder, a spiral spring embedded in each of said holes, a brush inserted in each of said holes against the spring, one of the brushes in each brush-holder being metal and the other of some conducting material containing a lubricant and the brushes located diagonally opposite each other being made of the same material, so that a metal brush will run over the same path on the commutator as a brush containing a lubricant, and an electrical conductor connected with each of said brush-holders.

2. In an apparatus of the class described, a brush-holder, a clamping-plate, a conducting-wire between the clamping-plate and the brush-holder, and a plurality of screws for securing said clamping-plate to the brush-holder.

3. In an apparatus of the class described, an armature, a pair of pole-pieces, a closed box secured to one end of said pole-pieces with holes in the opposite sides thereof, a commutator mounted within the box, means for holding the brushes secured to the opposite sides of the box and registering with the holes therein, and brushes mounted in said brush-holders.

4. In an apparatus of the class described, an armature, pole-pieces, a commutator, a shaft on which the commutator is mounted, a box secured to the pole-pieces for inclosing the commutator and through which said shaft extends, the sides of the box being provided with openings, clamping-sleeves secured to the box on each side in line with the openings therein, and brush-holders secured in said clamping-sleeves, said brushes being smaller than said openings and extending therethrough.

5. In an apparatus of the class described, brush-holders, sleeves for receiving and holding said brush-holders that are split for a portion of their length at their outer ends, and means for clamping the outer ends of the sleeves on the brush-holders.

6. In an apparatus of the class described, brush-holders, sleeves for receiving and holding said brush-holders that are split for a portion of their length at their outer ends and have a lug at the outer ends on each side of the split, and screws for drawing said lugs together.

7. In an apparatus of the class described, an armature, pole-pieces, a commutator, a shaft on which the commutator is mounted, a box secured to the pole-pieces for inclosing the commutator and through which the shaft extends, the upper end of the box being open and having an upwardly-extending flange with a shoulder surrounding it, a lid with a downwardly-extending flange adapted to envelop the upwardly-extending flange of the box, and a spring for holding the lid closed.

8. In an apparatus of the class described, a commutator, a shaft on which the commutator is mounted, a box for inclosing the commutator and through which the shaft extends, a lid for said box, a horizontal arm secured to one side of said box, a flat spring for holding the lid closed, and a rivet for securing said spring to the horizontal arm.

9. In an apparatus of the class described, a commutator, a shaft on which the commutator is mounted, a box for inclosing the commutator and through which the shaft extends, a bearing for the shaft integral with the box having a circumferential groove within it near its juncture with the box, an outlet from said groove through the under side of the bearing, and an oil-cup on said bearing communicating with its interior.

In witness whereof I have hereunto affixed my signature in the presence of the witnesses herein named.

JOHN W. BLACKLEDGE.

Witnesses:
FLORENCE E. BRYANT,
V. H. LOCKWOOD.